(12) United States Patent
Nilsson

(10) Patent No.: US 12,066,062 B2
(45) Date of Patent: Aug. 20, 2024

(54) DOG CLUTCH ACTUATOR

(71) Applicant: BorgWarner Sweden AB, Landskrona (SE)

(72) Inventor: Peter Nilsson, Vittsjö (SE)

(73) Assignee: BORGWARNER SWEDEN AB (SE)

( * ) Notice: Subject to any disclaimer, the term of this patent is extended or adjusted under 35 U.S.C. 154(b) by 16 days.

(21) Appl. No.: 17/290,658

(22) PCT Filed: Nov. 8, 2019

(86) PCT No.: PCT/EP2019/080686
§ 371 (c)(1),
(2) Date: Apr. 30, 2021

(87) PCT Pub. No.: WO2020/094844
PCT Pub. Date: May 14, 2020

(65) Prior Publication Data
US 2021/0381559 A1    Dec. 9, 2021

(30) Foreign Application Priority Data
Nov. 9, 2018    (SE) .................................... 1851393-7

(51) Int. Cl.
| F16D 28/00 | (2006.01) |
| F16D 11/14 | (2006.01) |
| H02K 7/108 | (2006.01) |
| B60K 23/08 | (2006.01) |
| F16D 11/00 | (2006.01) |

(52) U.S. Cl.
CPC .............. *F16D 28/00* (2013.01); *F16D 11/14* (2013.01); *H02K 7/108* (2013.01); *B60K 23/08* (2013.01); *F16D 2011/004* (2013.01)

(58) Field of Classification Search
CPC ......................... D16D 28/00; D16D 2023/123
See application file for complete search history.

(56) References Cited

U.S. PATENT DOCUMENTS

| 4,562,908 A | 1/1986 | Zouzoulas |
| 5,867,892 A | 2/1999 | Beakes |
| (Continued) | | |

FOREIGN PATENT DOCUMENTS

| CN | 2010078416 Y | 6/2008 |
| CN | 203892401 U | 10/2014 |
| (Continued) | | |

OTHER PUBLICATIONS

Chinese Office Action dated Oct. 27, 2022; Application No. 2019-80072824.0; Applicant: BorgWarner Sweden AB; 11 pages.

*Primary Examiner* — Stacey A Fluhart
(74) *Attorney, Agent, or Firm* — Dilworth IP, LLC

(57) ABSTRACT

An actuator for connecting and disconnecting a dog clutch having an axially moveable sleeve (3), the actuator (4) comprising an electric motor (6), wherein a rotor (61) of the motor is connected to a rotatable actuator rod (7), which is provided at its end with an eccentric pin (5) for such cooperation with the clutch sleeve (3) that a rotation of the actuator rod (7) 180° or less by means of the motor from a rotational position corresponding to one axial end position of the clutch sleeve (3) to a rotational position corresponding to the other axial end position of the clutch sleeve (3) leads to a connection or disconnection of the dog clutch.

14 Claims, 5 Drawing Sheets

(56) References Cited

U.S. PATENT DOCUMENTS

| | | |
|---|---|---|
| 2002/0093265 A1 | 7/2002 | Nelson |
| 2016/0072372 A1 | 3/2016 | Nelson |
| 2016/0241100 A1* | 8/2016 | Ito ............................ H02K 3/28 |
| 2016/0356324 A1* | 12/2016 | Severinsson ............ F16D 41/00 |

FOREIGN PATENT DOCUMENTS

| | | | | |
|---|---|---|---|---|
| CN | 104333192 A | * | 2/2015 | |
| CN | 207122566 | | 3/2018 | |
| DE | 102013200377 A1 | | 7/2014 | |
| DE | 202015000397 U1 | | 6/2015 | |
| DE | 102014224366 A1 | | 6/2016 | |
| DE | 102015202828 A1 | * | 8/2016 | |
| JP | S57118675 A | | 7/1982 | |
| JP | S57118675 U | | 7/1982 | |
| JP | 58009509 Y2 | | 2/1983 | |
| JP | H8251898 A | | 9/1996 | |
| JP | 2008256007 A | | 10/2008 | |
| JP | 2009183102 A | * | 8/2009 | ............... H02K 3/28 |
| JP | 2015231242 A | | 12/2015 | |
| JP | 2017506730 A | | 3/2017 | |
| KR | 20160119790 A | | 10/2016 | |
| WO | 2011019208 A1 | | 8/2010 | |
| WO | 2011/043722 A1 | | 10/2010 | |
| WO | 2015121021 A2 | | 8/2015 | |
| WO | 2015121021 A1 | | 1/2016 | |

* cited by examiner

DOG CLUTCH ACTUATOR

This application claims the benefit of Swedish Application No. 1851393-7 filed Nov. 9, 2018, and PCT Application No. EP2016/078648 filed Nov. 8, 2019.

TECHNICAL FIELD

The present invention relates to an actuator for connecting and disconnecting a dog clutch by activating an electric motor to axially move a clutch sleeve. The present invention also relates to an electric motor for a dog clutch actuator, to a dog clutch comprising an actuator and to a vehicle comprising a dog clutch.

BACKGROUND

A dog clutch of the type described herein can be used in many applications. A typical example includes an AWD (All Wheel Drive) vehicle, to which application reference is made in the following.

A drive system of an AWD vehicle may have an engine, a front axle with a differential, an intermediate shaft or cardan shaft, and a rear axle with a differential. In order to control the distribution of the torque not only to the front axle but also to the rear axle in accordance with the driving conditions, a disc coupling is arranged in the driveline to the rear axle, often in the intermediate shaft close to the differential.

The function of the coupling when driving the vehicle in an AWD mode is described elsewhere, for example in WO 2011/043722.

When it is desired to drive the AWD vehicle in an FWD (Forward Wheel Drive) mode, the disc coupling is disconnected, i.e. its discs are separated for preventing them from transmitting any torque. The coupling may be said to be in a disconnect mode. For enhancing this separation effect, the oil normally provided in the coupling for lubricating and cooling its discs can be removed from the coupling. In order to reduce the acceleration of the rotating mass of the intermediate propelling shaft and to eliminate the drag torque in bearings and sealings therefore, a clutch, preferably close to the front axle differential, may be provided to bring the intermediate shaft to a standstill in the FWD mode of the vehicle.

This clutch is preferably a dog clutch with two distinct positions: connected mode or disconnected mode. The two coaxial shafts to be connected or disconnected may be provided with end splines, and an axially movable clutch sleeve can be used for the mechanical engagement of the clutch.

It is crucial that the motion of such an axially moveable clutch sleeve is reliable and preferably smooth. Such characteristics are ultimately determined by the interface between the actuator and the axially moveable clutch sleeve as well as by the actuator itself. Many actuator controlled dog clutches of today suffer from problems with variations in the actuator force applied to the axially moveable sleeve, and thus suffer from thereto-related reliability issues.

SUMMARY

It is an object of the teaching herein to provide dog clutch actuator which can alleviate some of the problems with prior art. It is also an object of the invention to provide an electric motor for use in a dog clutch actuator, a dog clutch comprising said actuator and finally a vehicle comprising a dog clutch, which is improved over prior art. This object is achieved by a concept having the features set forth in the appended independent claims; preferred embodiments thereof being defined in the related dependent claims.

According to a first aspect, an actuator for connecting and disconnecting a dog clutch, having an axially moveable sleeve, is provided. The actuator comprises an electric motor, and a rotor of the motor is connected to a rotatable actuator rod. The actuator rod is provided at its end with an eccentric pin for such cooperation with the clutch sleeve that a rotation of the actuator rod 180° or less by means of the motor from a rotational position corresponding to one axial end position of the clutch sleeve to a rotational position corresponding to the other axial end position of the clutch sleeve leads to a connection or disconnection of the dog clutch. The electric motor of the actuator is configured to reduce the variations in the linear axial force transmitted by the eccentric pin to the clutch sleeve during the rotation of the actuator rod. The reduction in axial force variations allows a more reliable dog clutch actuation. Preferably, the variations in linear axial force are below 10%, or even below 5%. If the maximum force is in the range of 25 N, the linear axial force will in such embodiment always be within 25±2.5% N, i.e. 25±0.3125 N.

In some applications, the difference between the maximum axial force and the minimum axial force may restrict usage of a rotary actuator. I.e. the lowest axial force is too low, but if the torque is increased from the motor it will result in the highest axial force being too high. Such situations are to a large extent avoided by the present invention.

In an embodiment, coils of the electric motor are connected in series. The electric motor configuration mitigates the axial force amplification that inherently exists in rotary actuators when the rotary motion is translated to an axial motion.

The electric motor may be arranged in relation to the actuator such that it only has one torque output maximum between the two axial end positions of the clutch sleeve for each current direction provided to the electric motor.

In an embodiment, the electric motor torque output decreases symmetrically in both rotational directions of the actuator rod around the torque output maximum. The torque output profile thus essentially matches the axial force amplification and thus mitigates the effect thereof.

A first axial end position of the clutch sleeve may equate to a position of the actuator rod of between −80°-−65°, and a second axial end position of the clutch sleeve equates to a position of the actuator rod of between 65°-80°. The span of rotation of the actuator being less than 180° improves the reliability of the actuation as the motor torque output decreases with increasing/decreasing rotational distance from the 0° position. As the actuator rod nears 90° or −90°, the torque drops significantly or even completely disappears, hence, such a position of the actuator rod, or more specifically the rotor of the electric motor, is preferably avoided.

The electric motor torque output maximum may be arranged in an actuator rod position of between −10° and 10°, preferably approximately 0°. This means that the electric motor and the actuator are aligned such that the torque output maximum corresponds to a rotational position essentially in the center of the rotational end positions of the actuator rod.

An actuator rod position of approximately 0° may equate to an axial positon of the clutch sleeve essentially in the center between the axial end positions thereof.

In one embodiment, the eccentricity radius of the eccentric pin is between 2.5 mm and 4 mm, preferably approximately 3.15 mm.

In a second aspect, an electric motor configured for use in a dog clutch actuator according to the first aspect is provided. The electric motor is a 2-pole brushless DC motor.

In an embodiment, the electric motor comprises a centrally arranged permanent magnet rotor connected to the actuator rod and an outer stationary armature.

In one embodiment, the coils of the electric motor are connected in series.

In a third aspect, a dog clutch for connecting and disconnecting two shafts in a drive line of a vehicle is provided. The dog clutch comprises an actuator according to the first aspect being driven by an electric motor according to the second aspect.

In a fourth aspect is a vehicle provided comprising a dog clutch according to the third aspect.

BRIEF DESCRIPTION OF DRAWINGS

The invention will be described in further detail below with reference to the accompanying drawings, in which.

DETAILED DESCRIPTION

The disclosed embodiments will now be described more fully hereinafter with reference to the accompanying drawings, in which certain embodiments of the invention are shown. Like numbers refer to like elements throughout.

A drive system of an AWD (All Wheel Drive) vehicle is well known in the art. Typical examples are shown in WO 2011/043722, as mentioned earlier in the background section. The present invention is concerned with a dog clutch to be used e.g. with such system.

Figure 1:
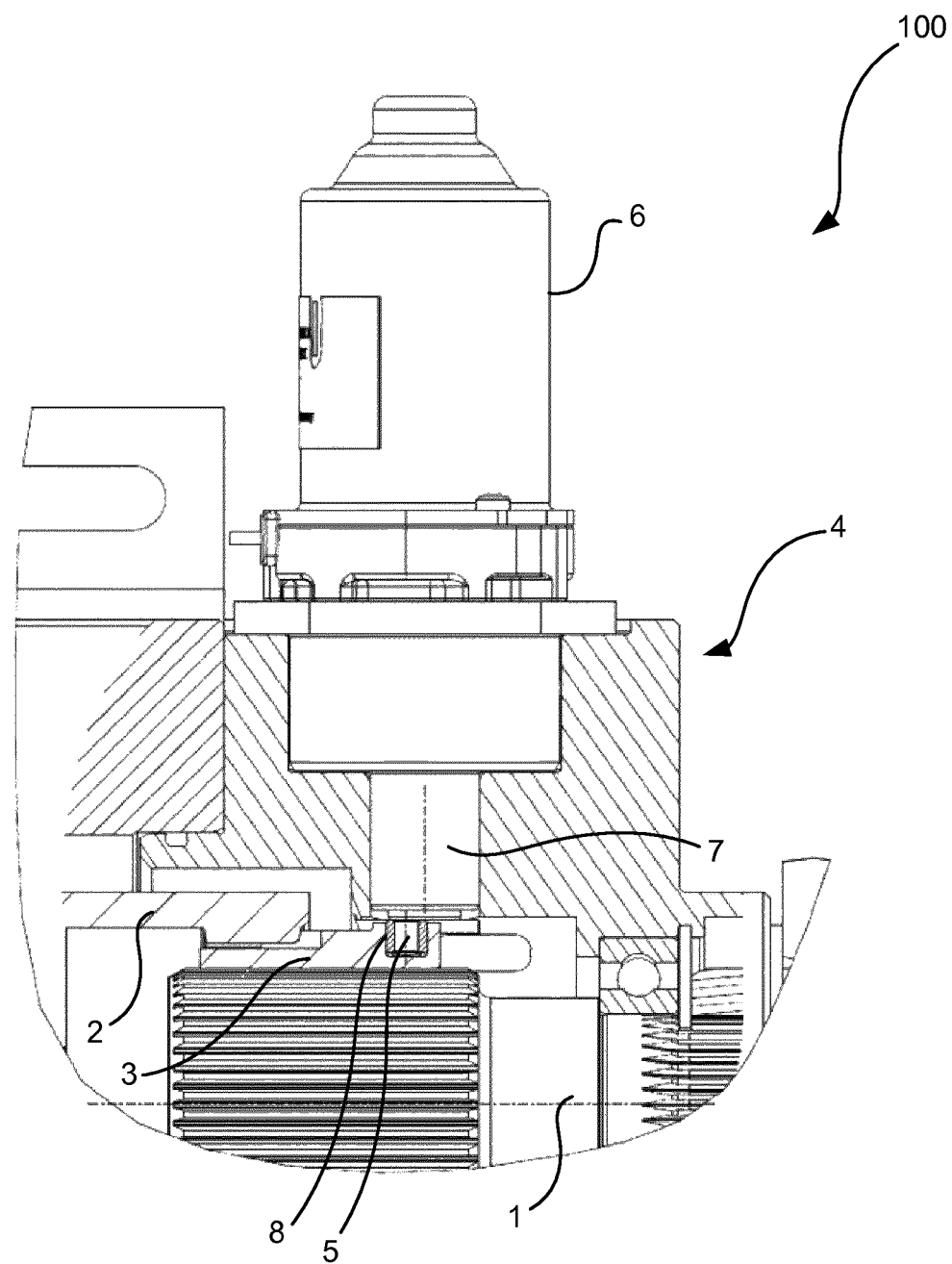
FIG. 1 shows a schematic cross-sectional view of a dog clutch according to an embodiment.

FIG. 1 is an overall view of a dog clutch 100 for connecting or disconnecting a normal shaft 1 and a hollow shaft 2, journaled for rotation. The normal shaft 1 is provided with external splines, with which internal splines of a clutch sleeve 3 cooperate. The clutch sleeve 3 is also provided with external teeth for cooperation with internal teeth of the hollow shaft 2. With the clutch sleeve 3 in the position to the left as shown in FIG. 1 the dog clutch 100 is in a connected mode. If the clutch sleeve 3 on the other hand is brought to the right in FIG. 1, the dog clutch is disconnected.

The present invention is concerned with an actuator 4 for accomplishing the axial movement of the clutch sleeve 3 between the connect and disconnect positions.

A clutch actuator 4 of a rotary type, or in short a rotary clutch actuator, is fastened in the housing surrounding the dog clutch and is axially terminated by an eccentric pin 5, which in the shown embodiment extends into a shift bushing 8, guided by the housing and arranged in a circumferential groove in the clutch sleeve 3. The shift bushing 8 has an oblong hole for the eccentric pin 5 to move in. The eccentric pin 5 is mounted eccentrically at the end of a cylindrical actuator rod 7 journaled in the actuator housing.

Other practical solutions for transforming the rotational movement of the eccentric pin 5 into an axial movement of the clutch sleeve 3 are feasible. When the rod 7 with its eccentric pin 5 is rotated 180° or less from its position in FIG. 1 with the pin 5 to the full left and with the dog clutch in its fully connected condition, the pin 5 will reach its full right position with the dog clutch fully disconnected. A smaller rotation of the eccentric pin 5 than 180° is however preferred, the span of the rotational position α1-α2 (shown in FIG. 4) is preferably in the range 170°-130°, or even more preferably approximately 150° to 140° and most preferred approximately 144°. The preferred ranges of the rotation angles α1-α2 will be described more thoroughly in relation to FIGS. 3 and 4. It is to be noted that for the purpose of clarity of the description of the actuator 4, that an actuator rod 7 rotational position angle α3 of 0° preferably corresponds to an axial position of the clutch sleeve 3 approximately in the center between its axial end positions.

Uppermost in FIG. 1 is the electric motor 6 shown. The electric motor 6 provides the rotational driving force or torque that is subsequently translated into an axial motion of the clutch sleeve 3. The electric motor 6 is fixedly mounted to the housing of the dog clutch 100. The electric motor 6 is preferably a 2-pole brushless DC motor, although other electric motor configurations are also feasible and are to be considered to fall within the scope of this disclosure.

Figure 2A:
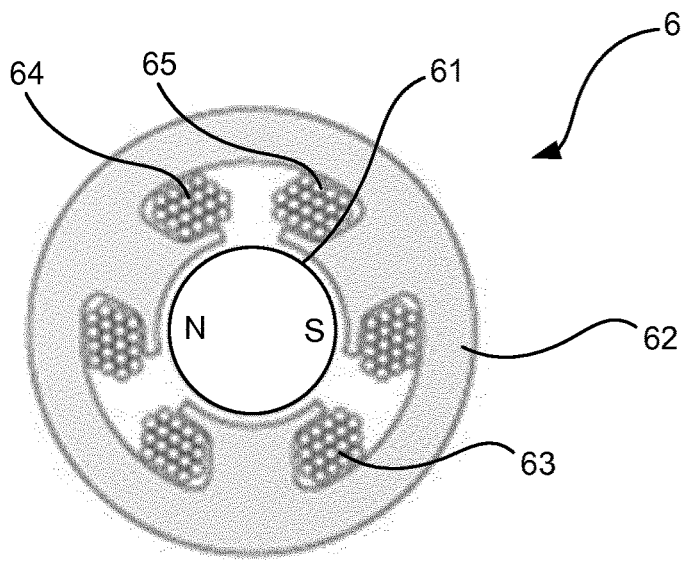
FIG. 2a shows a schematic cross-sectional view of an electric motor according to an embodiment.

Turning to FIG. 2a, a cross-sectional view of the electric motor 6 is shown. As can be seen, the electric motor 6 comprises an outer stationary armature 62 and an inner rotor 61 in the shape of a permanent magnet. The motor 6 could of course also be oppositely arranged, with an outer permanent magnet rotor and an inner stationary armature. The following description will be based on the configuration shown in FIG. 2a, but is equally applicable to the opposite configuration as well.

Figure 2B:
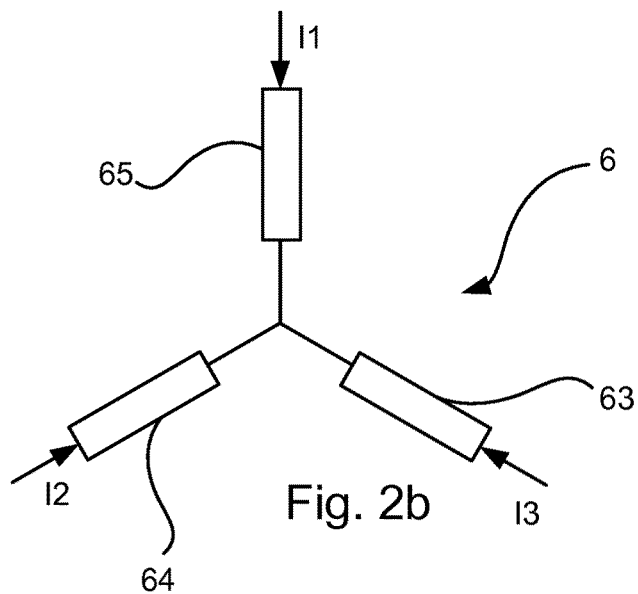
FIG. 2b shows a circuit diagram of a prior art motor.
Figure 2C:
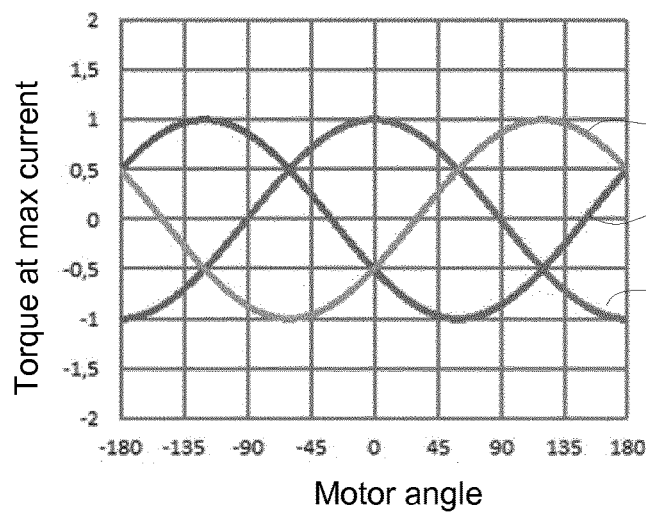
FIG. 2c is a diagram showing the torque output of the prior art motor of FIG. 2b.

As can be seen, the armature comprises three coils or windings 63, 64, 65. As is common technical knowledge, each of the coils 63, 64 65 generate a magnetic field depending on the direction of current flowing through them. A problem with existing electric motors in the context of use for driving a rotary actuator for a dog clutch is that they, under normal operation as is indicated in FIG. 2b, provide a more or less even torque during an entire revolution of the rotor 61, as is shown in FIG. 2c. Each phase will contribute to the total torque, which will be more or less constant as the motor rotates.

Normally and in most applications, this is desirable. However, in the context of the present invention, with the translation of the rotary motion of the eccentric pin 5 to an axial motion of the clutch sleeve 3, a constant torque output from the electric motor 6 will result in an uneven axial force over the axial translation of the clutch sleeve 3. This is because there exists an axial force amplification as the eccentric pin 5, or the actuator rod 7, nears its rotational end points, i.e. for a high (i.e. close to 90°) or low (i.e. close to −90°) angle α1, α2 respectively, i.e. when the clutch sleeve 3 is close to any of its axial end positions. Put in another way, the axial force exerted on the clutch sleeve 3 by the eccentric pin 5 is, for prior art solutions, at its lowest for an actuator rod position angle α3 of 0° and then increases with higher or lower angle α1, α2.

Figure 3A:
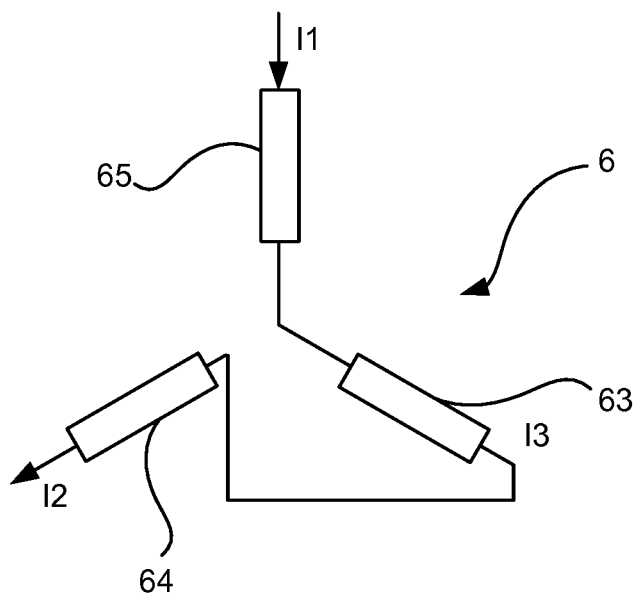
FIG. 3a shows a circuit diagram of a motor according to an embodiment.

To solve this problem, and now referring to FIG. 3a, the coils 63, 64, 65 in the electric motor 6 of the invention are instead connected in series. The coils are arranged circumferentially around the rotor 61, essentially equally spaced approximately 120° apart. The current will flow through each of the coils 63, 64, 65, whereby the total current I=I1=−I2=−I3.

It is desired to counter-balance the amplification effect described above of the eccentric pin 5 by providing a decreasing torque output from the electric motor 6 as the actuator rod 7 gets closer to its rotational end positions, while preferably avoiding having to use advanced control systems and sensors etc. for achieving this.

Figure 3B:
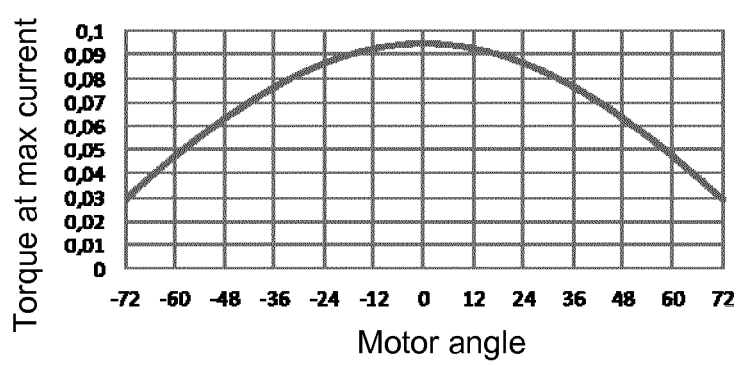
FIG. 3b is a diagram of torque output from an electric motor according to an embodiment.

In the present invention, the wiring of the electric motor 6 in accordance with FIG. 3a is such that the torque output will decrease when the motor 6 rotates away from its center position, as is shown in FIG. 3b. A maximum torque is provided when the angular offset is 0°.

The rotor 61 is as mentioned connected to the actuator rod 7, preferably directly but there may be interposed components or even a gearing as well. Regardless, it is preferred that the position of the rotor 61 shown in FIG. 2a corresponds to a position of the actuator rod 7 of approximately 0° (i.e. when the angle α3 is approximately 0°). The torque output will then decrease as the rotor 61 rotates in either direction away from the shown position until it reaches its maximum rotation of the actuator rod 7, i.e. 90° or preferably less to each side of the maximum torque position.

Figure 4:
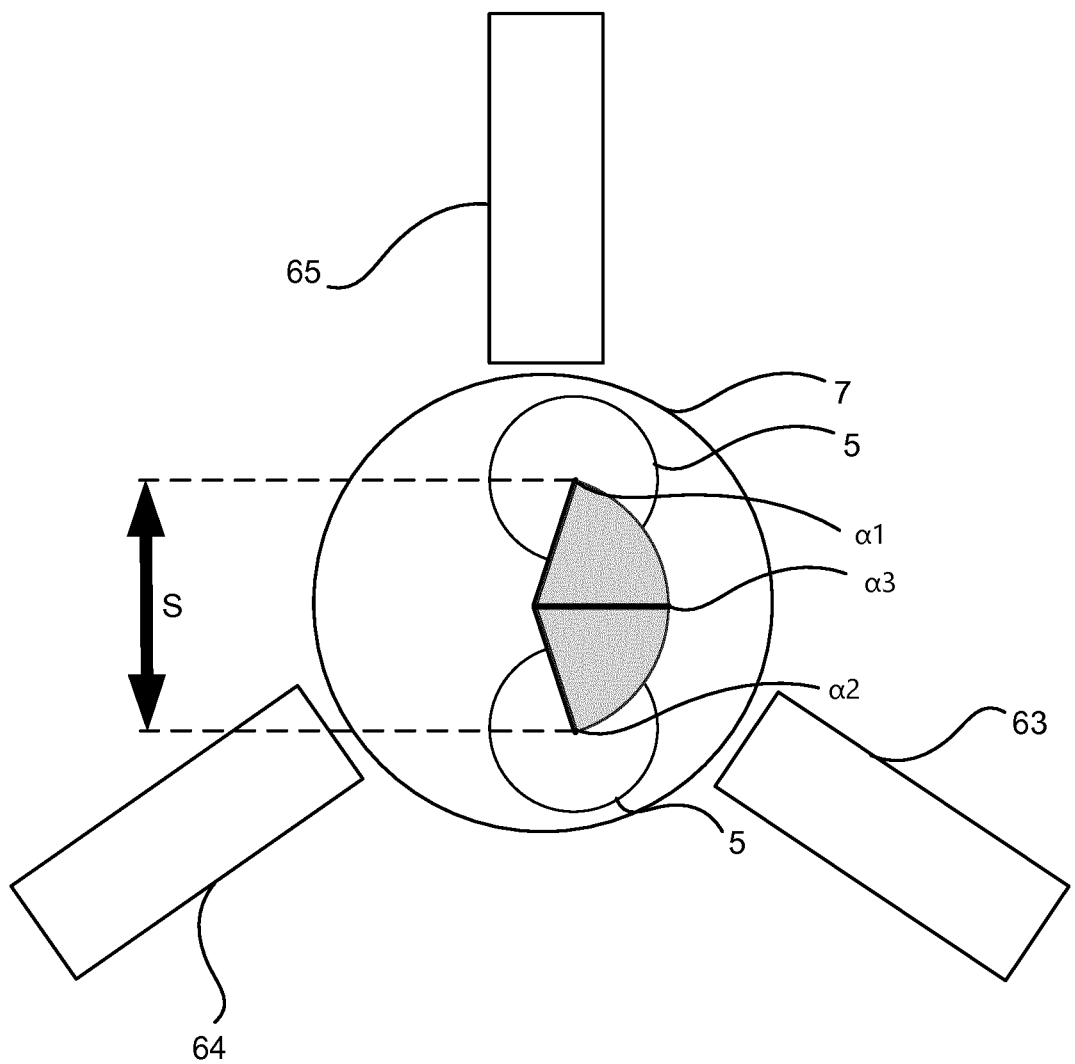
FIG. 4 shows a schematic view of certain components of an actuator according to an embodiment.

Turning now to FIG. 4, a schematic view of how the movement of the actuator rod 7 and the thereto-attached eccentric pin 5 relates to the electric motor 6, or more specifically to the coils 63, 64, 65 of the electric motor 6, is shown. The total axial motion, or stroke S, of the clutch sleeve 3 is illustrated by the arrow. The orientation of the electric motor 6 in relation to the intended axial motion of the clutch sleeve 3 is important. This is to ensure that the motor 6 torque output maximum corresponds to a rotational angle α3 of 0° of the actuator rod 7 which in turn corresponds to an axial position of the clutch sleeve 3 essentially in the center between its axial end positions. However, it is feasible that another configuration may be used for instance such that the torque output maximum is offset from a actuator rod 7 rotational positon α3 that is 0°, and/or that an actuator rod 7 rotational position α3 of 0° equates to an axial position of the clutch sleeve 3 that is not in the center between its two axial end positions.

The stroke S of the axially moveable clutch sleeve 3 is preferably between 2 mm and 10 mm, more preferably between 4 mm and 8 mm and even more preferred approximately 6 mm.

The eccentric radius, i.e. the distance from the center of the eccentric pin 5 to the center of the actuator rod 7 (or more specifically to the rotational axis of the eccentric pin 5) is preferably between 1 mm and 5 mm, more preferably between 2 mm and 4 mm and even more preferred approximately 3.15 mm.

In one preferred embodiment of the invention, the actuator rod 7 position α1-α2 range is approximately 144° (from −72° to 72°), the eccentric radius is approximately 3.15 mm and the stroke S of the clutch sleeve 3 is approximately 6 mm from one axial end position to the other.

Figure 5:
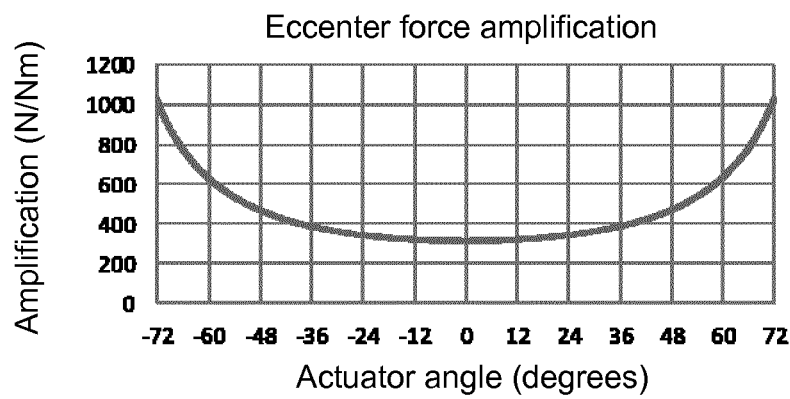
FIG. 5 is a diagram of eccentric force amplification of an actuator according an embodiment.
Figure 6:
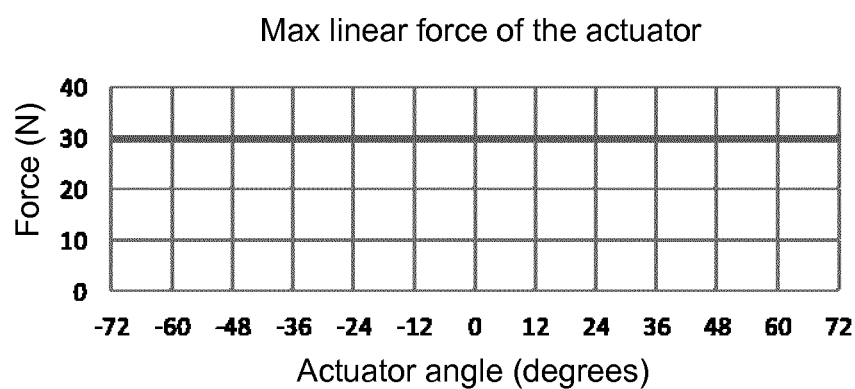
FIG. 6 is a diagram of actuator linear force of an actuator according an embodiment.

FIGS. 5 to 6 show diagrams all relating to simulated values of this preferred embodiment; other embodiments would provide different values but the same reasoning can be applied nonetheless. The values are applicable to either current direction, although as is realized by the skilled person, the directions of the torque etc. would be inverted. FIG. 5 and FIG. 6 bother relate to FIG. 3b, showing the actuator torque output as the actuator rod 7 rotates from −72° to 72°. As is visible in FIG. 3b, the torque output has a maximum around an actuator position angle α3 of 0°. The torque then decreases on both sides of the torque maximum essentially symmetrically as the actuator rod 7 approaches its rotational end positions.

In FIG. 5, the eccentric force amplification is shown. This is the undesired behavior that the electric motor 6, or actuator 4, of the invention is aimed at mitigating. The amplification effect occurs as a rotational movement of the actuator rod 7 at increasing/decreasing angles α1, α2 translates into a decreasing axial movement of the clutch sleeve 3.

In FIG. 6 is the linear axial force as measured on the clutch sleeve 3 shown over a rotation of the actuator rod 7 from one rotational end point to the other. As can be seen, the variations in torque supplied by the motor 6 and the appropriate relationship between the electric motor 6 and the actuator 4 generates an essentially constant linear force over the entire actuator rod 7 angle range. This equates to a dog clutch 100 that is improved over prior art dog clutches using rotary actuators, and increases the number of applications where a rotary actuator dog clutch may be used.

It should be mentioned that the inventive concept is by no means limited to the embodiments described herein, and several modifications are feasible without departing from the scope of the invention as defined in the appended claims.

The invention claimed is:

1. An actuator for connecting and disconnecting a dog clutch having an axially moveable clutch sleeve, the actuator comprising an electric motor including a rotor and a plurality of coils, wherein the rotor of the electric motor is connected to a rotatable actuator rod, which is provided at its end with an eccentric pin for such cooperation with the clutch sleeve that a rotation of the actuator rod 180° or less by means of the electric motor, from a rotational position corresponding to a first axial end position of the clutch sleeve to a rotational position corresponding to a second axial end position of the clutch sleeve, leads to a connection or disconnection of the dog clutch,
    wherein the coils of the electric motor are connected in series whereby the electric motor of the actuator is configured to reduce variations in a linear axial force transmitted by the eccentric pin to the clutch sleeve during the rotation of the actuator rod.

2. The actuator according to claim 1, wherein the electric motor of the actuator is configured to reduce the variations in the linear axial force transmitted by the eccentric pin to the clutch sleeve during the rotation of the actuator rod to a maximum of 10%.

3. The actuator according to claim 1, wherein the electric motor is arranged in relation to the actuator such that it has only one torque output maximum between the two axial end positions of the clutch sleeve for each current direction provided to the electric motor.

4. The actuator according to claim 1, wherein a torque output of the electric motor decreases symmetrically in both rotational directions of the actuator rod around a torque output maximum.

5. The actuator according to claim 1, wherein the first axial end position of the clutch sleeve equates to a rotational position (α1) of the actuator rod of between −80° and −65° from a center and wherein the second axial end position of the clutch sleeve equates to a rotational position (α2) of the actuator rod of between 65° and 80° from the center.

6. The actuator according to claim 1, wherein a torque output maximum of the electric motor is arranged in an actuator rod position (α3) of between −10° and 10°.

7. The actuator according to claim 6, wherein an actuator rod position (α3) of approximately 0° equates to an axial position of the clutch sleeve essentially in a center between the axial end positions thereof.

8. The actuator according to claim 1, wherein the electric motor of the actuator is configured to reduce the variations in the linear axial force transmitted by the eccentric pin to the clutch sleeve during the rotation of the actuator rod to a maximum of below 5%.

9. The actuator according to claim 1, wherein a torque output maximum of the electric motor is arranged in an actuator rod position (α3) of approximately 0°.

10. An actuator for connecting and disconnecting a dog clutch having an axially moveable clutch sleeve, the actuator comprising an electric motor including a rotor and a plurality of coils, wherein the rotor of the electric motor is connected to a rotatable actuator rod, which is provided at its end with an eccentric pin for such cooperation with the clutch sleeve that a rotation of the actuator rod 180° or less by means of the electric motor, from a rotational position corresponding to a first axial end position of the clutch sleeve to a rotational position corresponding to a second axial end position of the clutch sleeve, leads to a connection or disconnection of the dog clutch,
wherein the coils of the electric motor are connected in series whereby the electric motor of the actuator is configured to reduce variations in a linear axial force transmitted by the eccentric pin to the clutch sleeve during the rotation of the actuator rod, wherein an eccentricity radius of the eccentric pin is between 2,5 mm and 4 mm.

11. An electric motor configured to be used in an actuator for connecting and disconnecting a dog clutch having an axially moveable clutch sleeve, the electric motor comprising a rotor and a plurality of coils, wherein the rotor of the electric motor is connected to a rotatable actuator rod, which is provided at its end with an eccentric pin for such cooperation with the clutch sleeve that a rotation of the actuator rod 180° or less by means of the electric motor, from a rotational position corresponding to a first axial end position of the clutch sleeve to a rotational position corresponding to a second axial end position of the clutch sleeve, leads to a connection or disconnection of the dog clutch,
wherein the coils of the electric motor are connected in series whereby the electric motor of the actuator is configured to reduce variations in a linear axial force transmitted by the eccentric pin to the clutch sleeve during the rotation of the actuator rod, wherein the electric motor is a 2-pole brushless DC motor.

12. The electric motor according to claim 11, wherein the electric motor comprises a central permanent magnet rotor connected to the actuator rod and an outer stationary armature.

13. A dog clutch for connecting and disconnecting two shafts in a drive line of a vehicle, said dog clutch comprising an actuator for connecting and disconnecting the dog clutch having an axially moveable clutch sleeve, the actuator comprising an electric motor including a rotor and a plurality of coils, wherein the rotor of the electric motor is connected to a rotatable actuator rod, which is provided at its end with an eccentric pin for such cooperation with the clutch sleeve that a rotation of the actuator rod 180° or less by means of the electric motor, from a rotational position corresponding to a first axial end position of the clutch sleeve to a rotational position corresponding to a second axial end position of the clutch sleeve, leads to a connection or disconnection of the dog clutch,
wherein the coils of the electric motor are connected in series whereby the electric motor of the actuator is configured to reduce variations in a linear axial force transmitted by the eccentric pin to the clutch sleeve during the rotation of the actuator rod, the actuator being driven by the electric motor, wherein the electric motor is a 2-pole brushless DC motor.

14. A vehicle comprising a dog clutch for connecting and disconnecting two shafts in a drive line of the vehicle, said dog clutch comprising an actuator for connecting and disconnecting the dog clutch having an axially moveable clutch sleeve, the actuator comprising an electric motor including a rotor and a plurality of coils, wherein the rotor of the electric motor is connected to a rotatable actuator rod, which is provided at its end with an eccentric pin for such cooperation with the clutch sleeve that a rotation of the actuator rod 180° or less by means of the electric motor, from a rotational position corresponding to a first axial end position of the clutch sleeve to a rotational position corresponding to a second axial end position of the clutch sleeve, leads to a connection or disconnection of the dog clutch,
wherein the coils of the electric motor are connected in series whereby the electric motor of the actuator is configured to reduce variations in a linear axial force transmitted by the eccentric pin to the clutch sleeve during the rotation of the actuator rod, the actuator being driven by the electric motor, wherein the electric motor is a 2-pole brushless DC motor.

* * * * *